(12) United States Patent
Ford

(10) Patent No.: US 10,281,119 B2
(45) Date of Patent: May 7, 2019

(54) MODULAR STRIP LIGHTING SYSTEM WITH RECHARGEABLE BATTERY ON COMMON POWER RAIL

(71) Applicant: 9609385 CANADA INC., Beaconsfield (CA)

(72) Inventor: Timothy D. F. Ford, Beaconsfield (CA)

(73) Assignee: 9609385 CANADA INC., Beaconsfield (CA)

( * ) Notice: Subject to any disclaimer, the term of this patent is extended or adjusted under 35 U.S.C. 154(b) by 47 days.

(21) Appl. No.: 15/330,783

(22) Filed: Nov. 7, 2016

(65) Prior Publication Data

US 2017/0130941 A1    May 11, 2017

Related U.S. Application Data

(60) Provisional application No. 62/251,745, filed on Nov. 6, 2015.

(51) Int. Cl.
*F21V 21/005* (2006.01)
*H02J 7/00* (2006.01)
(Continued)

(52) U.S. Cl.
CPC ............ *F21V 21/005* (2013.01); *F21S 2/005* (2013.01); *F21S 4/28* (2016.01); *F21S 9/02* (2013.01); *F21V 3/02* (2013.01); *F21V 5/045* (2013.01); *F21V 23/023* (2013.01); *F21V 29/70* (2015.01); *H02J 7/0013* (2013.01); *H05B 33/0821* (2013.01); *H05B 37/0227* (2013.01); *H05B 37/0272* (2013.01); *F21V 23/005* (2013.01);
(Continued)

(58) Field of Classification Search
CPC ..... F21S 2/005; F21S 4/28; F21S 9/02; F21V 21/005; F21V 23/005; H05B 33/0821; H05B 33/0227; H05B 33/0272; H02J 7/0013; F21Y 2103/10
USPC .......................................................... 320/134
See application file for complete search history.

(56) References Cited

U.S. PATENT DOCUMENTS

2006/0181244 A1*   8/2006  Luo ..................... H01M 10/441
                                                             320/128
2009/0296381 A1*  12/2009  Dubord ................... F21S 2/005
                                                             362/218

(Continued)

*Primary Examiner* — Anh T Mai
*Assistant Examiner* — Michael Chiang
(74) *Attorney, Agent, or Firm* — Hugh Mansfield

(57) ABSTRACT

A modular strip lighting assembly is disclosed comprising a plurality of elongate strip lights. The strip lights comprise a plurality of spaced and interconnected LEDs, a power rail segment for providing power to the interconnected LEDs, a rechargeable battery module, a battery charge/discharge circuit connected to the power rail segment and an external power supply. The elongate strip lights, the battery module and the adaptor are connectable end to end and such that, when assembled, the plurality of power rail segments combine to form a common power rail. When the external power supply provides power to the common rail, each of the rechargeable batteries is charged by the battery charge/discharge circuit using power on the common rail and when the external power supply does not provide power to the common rail, each of the rechargeable batteries provides power to the common rail.

7 Claims, 5 Drawing Sheets

(51) Int. Cl.
*F21V 29/70* (2015.01)
*F21S 4/28* (2016.01)
*F21S 9/02* (2006.01)
*F21V 3/02* (2006.01)
*F21V 23/02* (2006.01)
*H05B 37/02* (2006.01)
*F21S 2/00* (2016.01)
*F21V 5/04* (2006.01)
*H05B 33/08* (2006.01)
*F21Y 103/10* (2016.01)
*F21Y 115/10* (2016.01)
*F21V 23/00* (2015.01)
*F21Y 115/15* (2016.01)

(52) U.S. Cl.
CPC ....... *F21Y 2103/10* (2016.08); *F21Y 2115/10* (2016.08); *F21Y 2115/15* (2016.08)

(56) References Cited

U.S. PATENT DOCUMENTS

| | | | | |
|---|---|---|---|---|
| 2010/0271804 | A1* | 10/2010 | Levine | F21V 21/005 362/35 |
| 2010/0284193 | A1* | 11/2010 | Ford | F21V 5/04 362/311.06 |
| 2012/0026726 | A1* | 2/2012 | Recker | F21K 9/13 362/157 |
| 2012/0049739 | A1* | 3/2012 | Clough | F21L 4/00 315/113 |
| 2013/0141904 | A1* | 6/2013 | Verfuerth | F21V 15/01 362/221 |
| 2013/0163234 | A1* | 6/2013 | Hsien | F21S 2/005 362/190 |
| 2013/0163235 | A1* | 6/2013 | Chuang | F21V 15/01 362/190 |

* cited by examiner

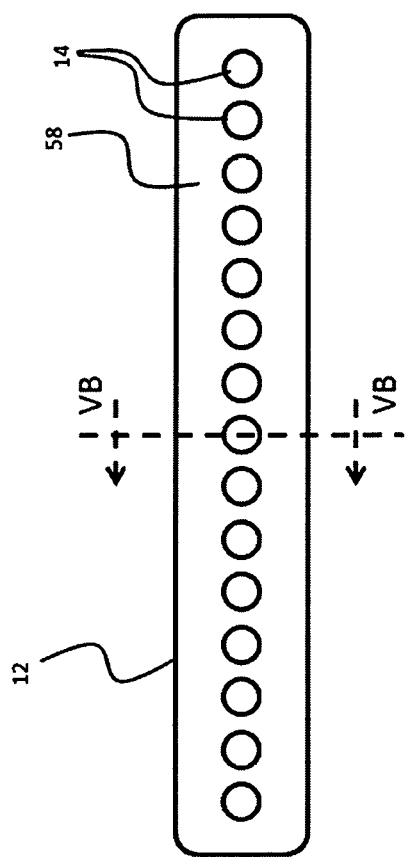
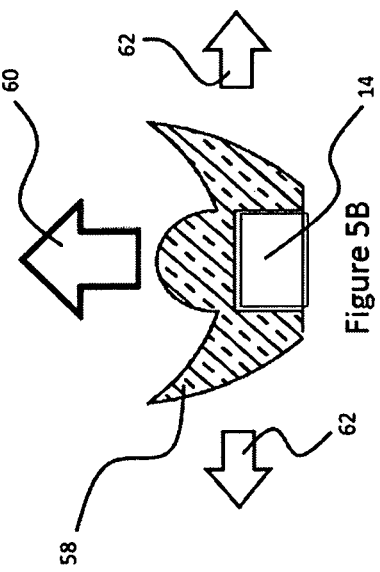

MODULAR STRIP LIGHTING SYSTEM WITH RECHARGEABLE BATTERY ON COMMON POWER RAIL

FIELD OF THE INVENTION

The present invention relates to a modular strip lighting system.

SUMMARY OF THE INVENTION

There is provided a modular strip lighting assembly comprising a plurality of elongate strip lights, each of the strip lights comprising a plurality of spaced and interconnected LEDs, a power rail segment for providing power to the interconnected LEDs, a first microprocessor and a wireless transceiver, at least one battery module comprising a rechargeable battery, a power rail segment, a battery charge/discharge circuit connected to the power rail segment and a microcontroller for controlling the battery charge/discharge circuit, and an external power supply comprising an electronic circuit having a low voltage DC power output of between 12 and 30 volts and an adaptor comprising a power rail segment connected to the output. Each of the elongate strip lights, the at least one battery module and the adaptor are connectable end to end and such that, when assembled, the plurality of power rail segments combine to form a common power rail and further wherein when the external power supply provides power to the common rail, each of the rechargeable batteries is charged by the battery charge/discharge circuit using power on the common rail and when the external power supply does not provide power to the common rail, each of the rechargeable batteries provides power to the common rail.

BRIEF DESCRIPTION OF THE DRAWINGS

FIG. 5A provides a top plan view of plurality of LEDs and an elongate lens in accordance with an illustrative embodiment of the present invention; and FIG. 5B provides a section view along line 5B-5B in FIG. 5A.

DETAILED DESCRIPTION OF THE ILLUSTRATIVE EMBODIMENTS

Figure 1:
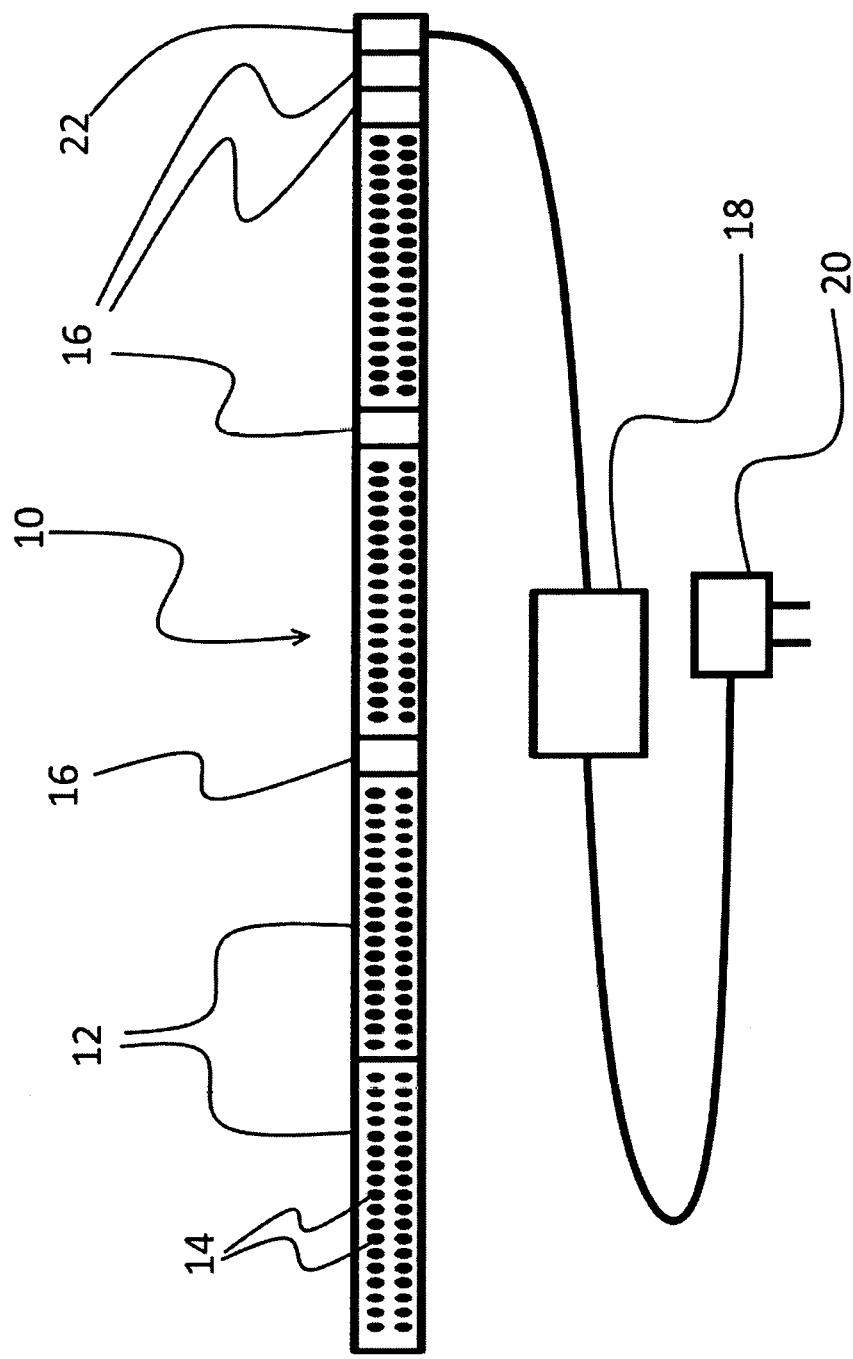
FIG. 1 provides a schematic diagram of a modular strip lighting system in accordance with an illustrative embodiment of the present invention.

Referring now to FIG. 1, a modular strip lighting assembly in accordance with an illustrative embodiment of the present invention, and generally referred to using the reference numeral 10, will now be described. The assembly 10 comprises a plurality of modular LED strip lights 12 each comprised of a plurality of LEDS as in 14 arranged along a length thereof. One or more battery modules as in 16 are provided to provide power to the LEDs 14 such that they can be used to illuminate a space such as a tent or building or the like. In a first embodiment the LEDs 14 are capable of emitting a white light but in particular embodiments may also be able to emit other colours of light such as red or the like. The battery modules may be charged with an external power supply 18 comprising a plug 20 for attachment to the mains or a generator or the like. Illustratively the external power supply converts a 110V or 220V AC mains voltage into a 12V to 30V DC voltage for supplying the LED strip lights 12 and the battery modules 16. Illustratively the LED strip lights 12 and battery modules 16 comprise a pair of like contacts (not shown) positioned at each ends and which engage with complementary contacts on other LED strip lights 12 and battery modules 16 when such LED strip lights 12 and battery modules 16 are positioned adjacent one another and such that current may flow freely between the LED strip lights 12 and battery modules 16 via these contacts. Similarly, the external power supply includes an adaptor 22 which is interconnected with one or other of the LED strip lights 12 and battery modules 16 and such that power is supplied to the LED strip lights 12 for illuminating the LEDs 14 and the battery modules 16 for charging.

Figure 2:
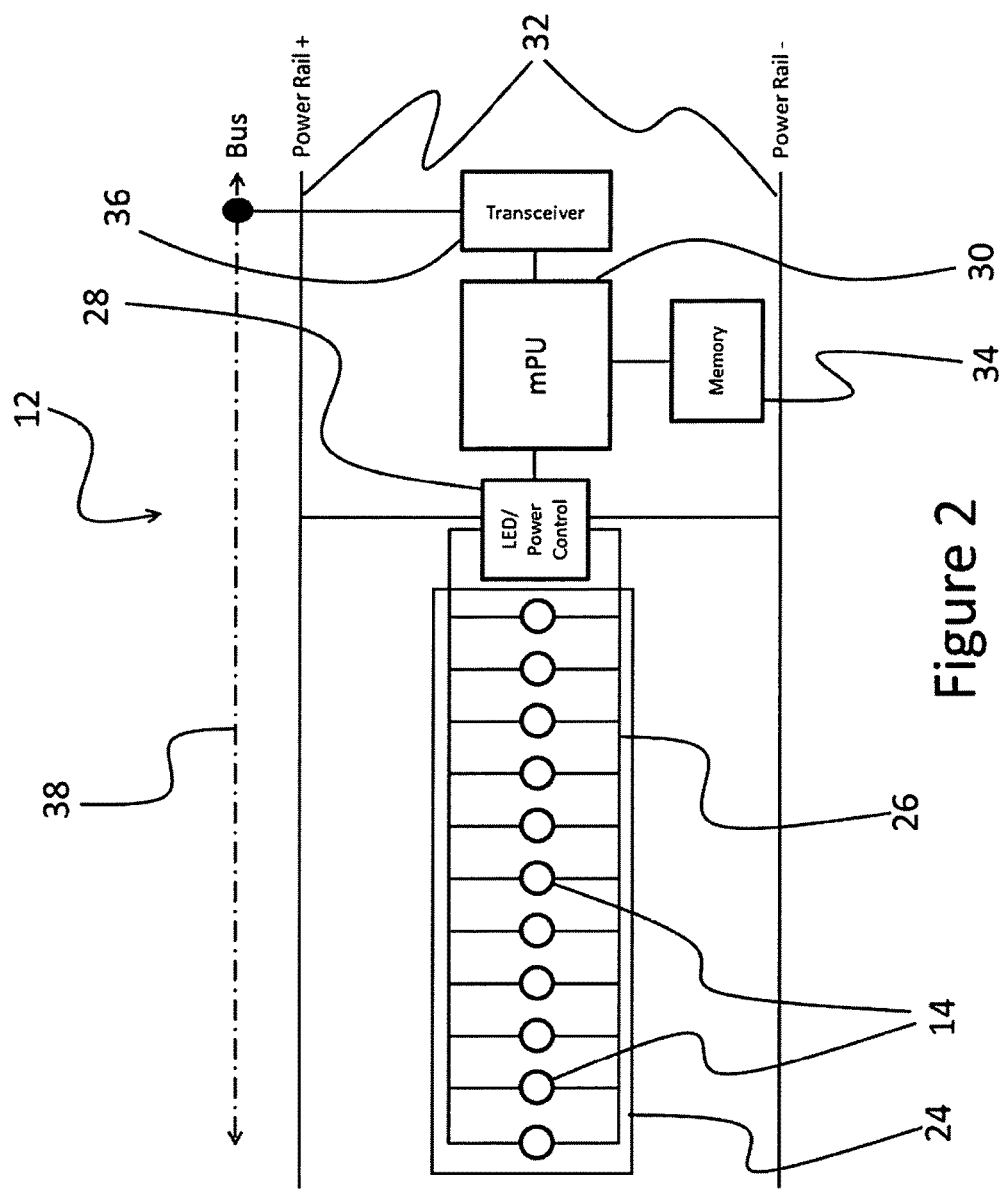
FIG. 2 provides a schematic diagram of a modular strip light for use in a modular strip lighting system and in accordance with an illustrative embodiment of the present invention.

Referring now to FIG. 2, each of the strips lights comprises a plurality of LEDs 14 arranged along a length of the strip light 12 and such that an even illumination is provided along a length of the strip light 12. Illustratively the LEDs 14 are arranged on a printed circuit board (PCB) 24 comprising a plurality of conductive traces 26. Power for illuminating the LEDs is provided by a power control module 28 via the conductive traces 26. Illustratively, the power control module 28, as required and under control of a microprocessor 30, boosts or bucks a voltage/current supplied by a power rail segment 32 such that it is suitable for illuminating the LEDs as in 14 to a desired illumination. In order to control the power control module 28, the microprocessor 30 uses code stored in a memory 34, such as flash memory and/or RAM or the like. Additionally, the microprocessor 30 can communicate with other microprocessors of other strip lights or a remote control (not shown) via a transceiver 36 and a communications connection 38, such as a lower power wireless communications system such as Bluetooth®, or the like, and in order to provide advanced illuminating effects, such as different colours, dimming and the like. In an alternative embodiment the LEDs 14 can be replaced with a single elongate Organic LED (not shown).

Figure 3:
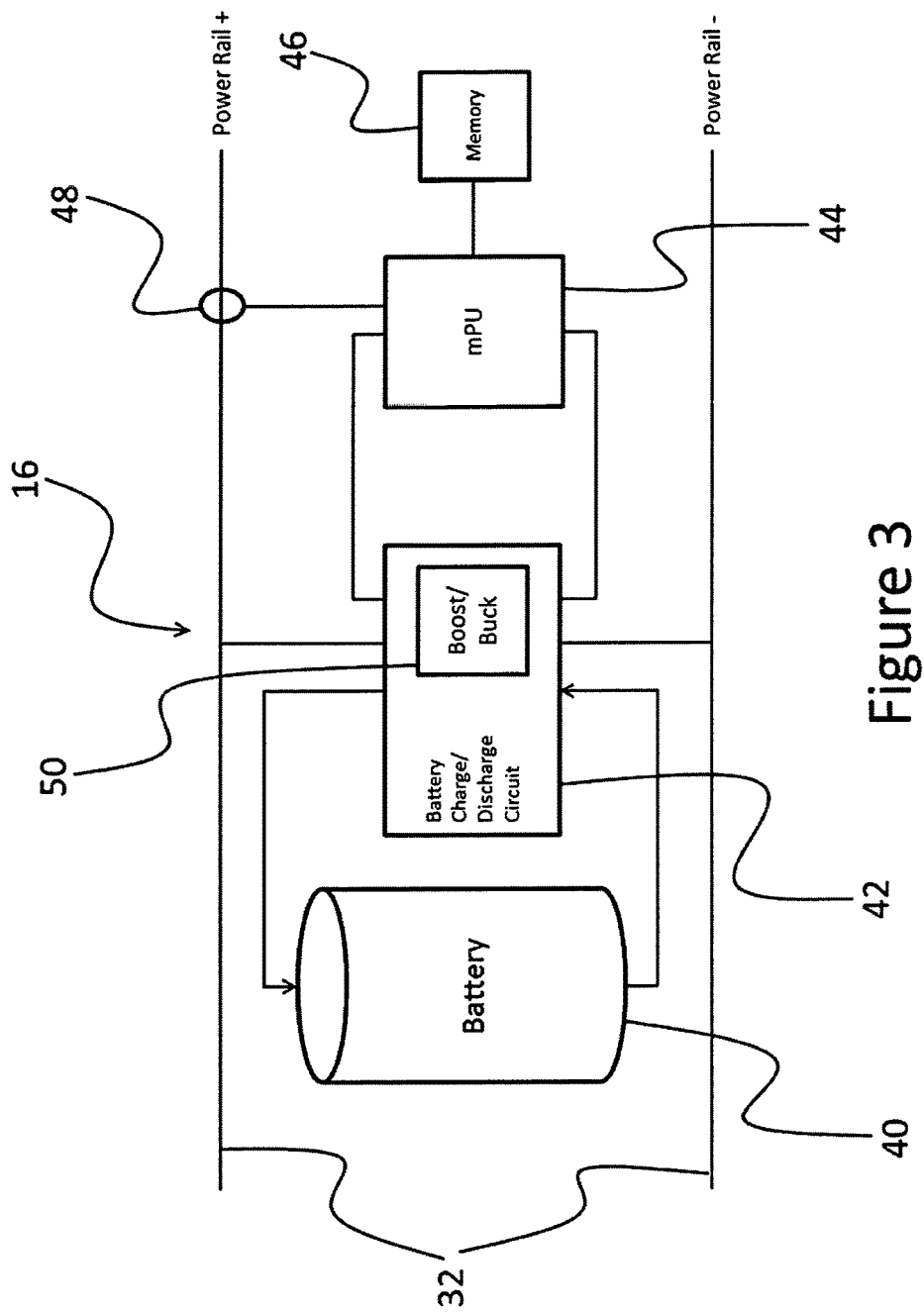
FIG. 3 provides a schematic diagram of a battery module for use in a modular strip lighting system and in accordance with an illustrative embodiment of the present invention.

Referring now to FIG. 3, the battery modules 16 comprises a rechargeable battery 40 which is selectively charged or discharged by a battery charge/discharge circuit 42 and under control of a microprocessor 44. The microprocessor 44 selectively charges or discharges the rechargeable battery 40 using code and data stored in memory 46, such as flash memory and/or RAM or the like, input as to the voltage and/or current flowing within the power rail segment 32 as determined by a voltage/current sensor 48 and input as to the condition of the battery. In this regard, the microprocessor 44 determines, based on the sensed voltage and/or current flowing within the power rail segment 32 whether or not the power rail segment 32 is being supplied by the external power supply (reference 18 in FIG. 1).

Still referring to FIG. 3, in the event that the power rail segment 32 is being supplied by the external power supply 18, the microprocessor controls the battery charge/discharge circuit 42 such that the rechargeable battery 40 is charged. In the event that the rechargeable battery 40 is fully charge, the battery charge/discharge circuit 42 provides a trickle charge to the battery 40. In the event that the power rails 32 are no longer being supplied by the external power supply 18, the microprocessor controls the battery charge/discharge circuit 42 such that the rechargeable battery 40 is discharged onto the power rail segment 32. In this manner, the battery module(s) 16 combine to provide an uninterruptable supply of power to the LED strip lights 12. In this regard a boost/buck circuit 50 may be provided in order to ensure that the output voltage and/or current of the battery module when powering the microprocessor 44 remains within specification.

Referring back to FIG. 2, in a particular embodiment, and in order to dissipate heat generated by the LEDs 14, an elongate heat sink (not shown) can be provided along the length of the PCB 24.

Figure 4A:
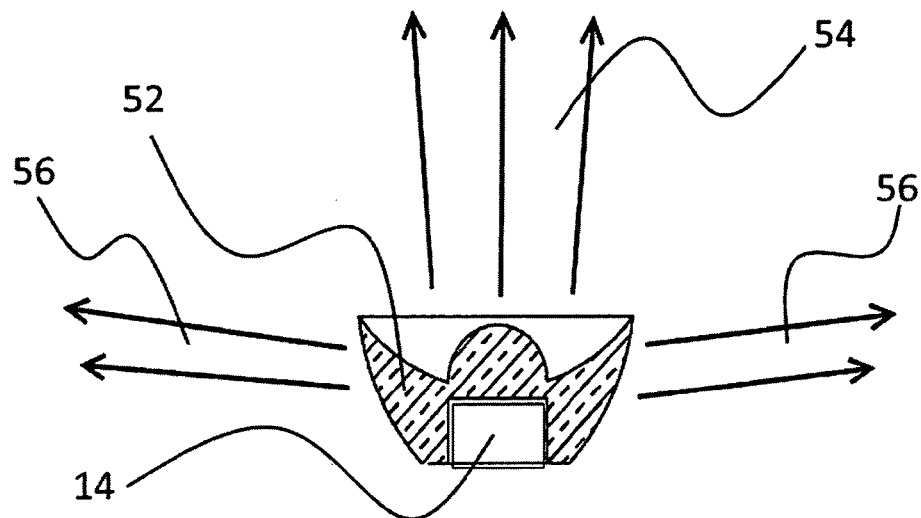
FIG. 4A provides a sectional view of an LED and batwing lens in accordance with an illustrative embodiment of the present invention.
Figure 4B:
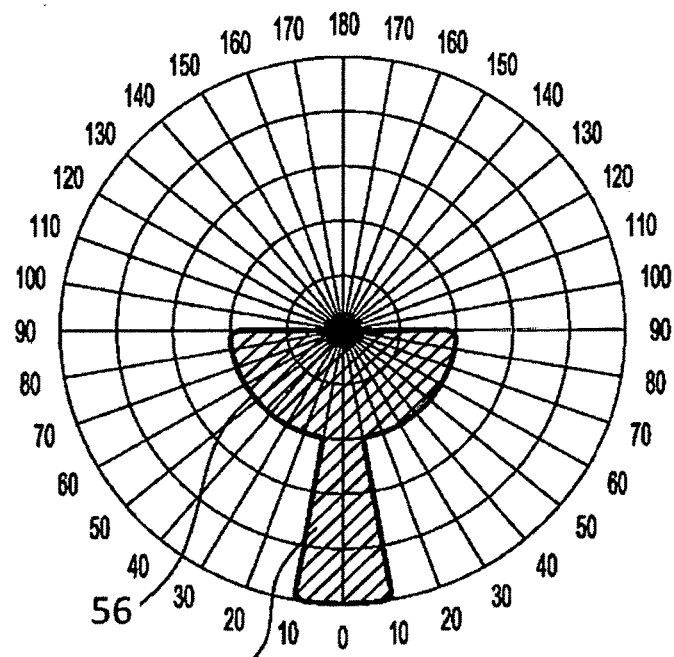
FIG. 4B provides a chart of the emission strength of the LED and lens combination of FIG. 4A.

Referring to FIGS. 4A and 4B, in a particular embodiment each of the LEDs 14 can be encased within a batwing style lens 52. The batwing lens 52 shapes the dispersion of the partially collimated light emitted by an LED 14 such that it comprises a bright primary beam 54, illustratively with a beam angle of about 30 degrees and a diffuse secondary beam 56 illustratively with a beam angle of about 180 degrees. The lens can be manufactured from a variety of materials such as polycarbonate or the like, or optical silicone.

Referring now to FIG. 5A, in a particular embodiment an elongate lens is provided. The lens 58 is moulded to receive a plurality of LEDs 14 of the strip light 12 along a length thereof. With reference to FIG. 5B the lens 58 has a batwing like cross section such that intense light is emitted primarily in front of the LED 14, while less intense light is emitted to the sides of the LED 14. In this manner, if the modular strip lighting assembly 10 is mounted to the ceiling of a room or tent or the like (not shown) for example, a region of intense light is provided in a region directly below the modular strip lighting assembly 10 while a more diffuse light is provided in a region to either side of modular strip lighting assembly 10.

Although the present invention has been described hereinabove by way of specific embodiments thereof, it can be modified, without departing from the spirit and nature of the subject invention as defined in the appended claims.

I claim:

1. A modular strip lighting assembly comprising:
   a plurality of elongate strip lights, each of said strip lights comprising a plurality of spaced and interconnected LEDs and a power rail segment for providing power to said interconnected LEDs and a wireless transceiver wherein an illumination of said elongate strip light is controllable via said wireless transceiver;
   at least one battery module comprising a battery, a power rail segment, a battery charge/discharge circuit connected to said power rail segment and a microcontroller for controlling said battery charge/discharge circuit; and
   an external power supply comprising an electronic circuit having a low voltage DC power output of between 12 and 30 volts and an adaptor comprising a power rail segment connected to said output;
   wherein a first of said elongate tubular strip lights is electrically connectable at either end to both a second of said elongate tubular strip lights and one of said at least one battery module and a first of said at least one battery module is electrically connectable at either end to both a second of said at least one battery module and one of said plurality of elongate strip lights, and wherein each of said elongate tubular strip lights, said at least one battery module and said adaptor are connectable end to end and such that, when assembled, said plurality of power rail segments combine to form a common power rail and further wherein when said external power supply provides power to said common rail, each of said batteries is charged by said battery charge/discharge circuit using power on said common rail and when said external power supply does not provide power to said common rail, each of said batteries provides power to said common rail.

2. The modular strip lighting assembly of claim 1, wherein each of said strip lights are tubular.

3. The modular strip lighting assembly of claim 1, wherein each of said spaced and interconnected LEDs are encased in an elongate lens.

4. The modular strip lighting assembly of claim 1, wherein each of said spaced and interconnected LEDs are arranged generally along a length of their respective strip light and have a batwing cross section.

5. The modular strip lighting assembly of claim 1, wherein said external power supply is pluggable into a power main and said electronic circuit further comprises a mains power input.

6. The modular strip lighting assembly of claim 1, comprising a plurality of said at least one battery module and wherein each of said plurality of battery modules is electrically connectable at either end to both one of said elongate strip lights and another of said plurality battery modules.

7. The modular strip lighting assembly of claim 6, wherein each of said plurality of batteries is adjacent said adaptor.

\* \* \* \* \*